(12) United States Patent
Kobayashi et al.

(10) Patent No.: US 10,686,515 B2
(45) Date of Patent: Jun. 16, 2020

(54) WIRELESS COMMUNICATION SYSTEM AND WIRELESS COMMUNICATION METHOD

(71) Applicant: Fujikura Ltd., Tokyo (JP)

(72) Inventors: Kiyoshi Kobayashi, Sakura (JP); Ning Guan, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/486,206

(22) PCT Filed: Dec. 18, 2017

(86) PCT No.: PCT/JP2017/045295
§ 371 (c)(1),
(2) Date: Aug. 15, 2019

(87) PCT Pub. No.: WO2018/150712
PCT Pub. Date: Aug. 23, 2018

(65) Prior Publication Data
US 2020/0059291 A1 Feb. 20, 2020

(30) Foreign Application Priority Data

Feb. 16, 2017 (JP) ................................ 2017-027041

(51) Int. Cl.
*H04B 7/08* (2006.01)
*H04B 1/00* (2006.01)
(Continued)

(52) U.S. Cl.
CPC ........... *H04B 7/088* (2013.01); *H01Q 21/293* (2013.01); *H04B 1/0064* (2013.01); *H04B 7/0404* (2013.01); *H04B 7/0617* (2013.01)

(58) Field of Classification Search
CPC .... H04B 7/088; H04B 7/0404; H04B 7/0671; H04B 1/0064; H01Q 21/293
See application file for complete search history.

(56) References Cited

U.S. PATENT DOCUMENTS

| 2002/0039912 A1* | 4/2002 | Yamaguchi ............ H01Q 1/246 455/561 |
| 2003/0164791 A1* | 9/2003 | Shinoda ............... H01Q 1/3233 342/70 |

(Continued)

FOREIGN PATENT DOCUMENTS

| JP | 2016-167878 A | 9/2016 |
| JP | 2016-528830 A | 9/2016 |

(Continued)

OTHER PUBLICATIONS

"IEEE Computer Society, IEEE Standard for Information technology—Telecommunications and information exchange between systems Local and metropolitan area networks—Specific requirements", Part 11: Wireless LAN Medium Access Control (MAC) and Physical Layer (PHY) Specifications, Amendment 3: Enhancements for Very High Throughput in the 60 GHz Band, IEEE Std 802.11adTM, dated Dec. 28, 2012, pp. 281-288, cited in the specification (11pages).

*Primary Examiner* — Ted M Wang
(74) *Attorney, Agent, or Firm* — Westerman, Hattori, Daniels & Adrian, LLP

(57) ABSTRACT

A wireless communication system includes a plurality of wireless stations. Each of at least two of the plurality of wireless stations includes, a first antenna transmitting a radio wave in a first frequency band, a second antenna transmitting a radio wave in a second frequency band lower in frequency than the first frequency band, a first transceiver transmitting and receiving a main signal in the first frequency band, and a second transceiver transmitting and receiving a control signal in the second frequency band. At least one of the at least two wireless stations includes, a variable beam antenna making a beam direction variable as the first antenna, a wide angle antenna having a radiation range equal to or wider than a variable range of the beam (Continued)

direction as the second antenna, and a controller controlling the beam direction of the variable beam antenna according to the control signal.

6 Claims, 9 Drawing Sheets

(51) Int. Cl.
*H01Q 21/29* (2006.01)
*H04B 7/06* (2006.01)
*H04B 7/0404* (2017.01)

(56) References Cited

U.S. PATENT DOCUMENTS

| 2005/0156780 | A1* | 7/2005 | Bonthron | H01Q 9/0457 342/107 |
| 2012/0220239 | A1 | 8/2012 | Hosoya et al. | |
| 2015/0004918 | A1 | 1/2015 | Wang et al. | |

FOREIGN PATENT DOCUMENTS

| WO | 2011-055536 A1 | 5/2011 |
| WO | 2015-021371 A1 | 2/2015 |
| WO | 2016-069115 A1 | 5/2016 |

* cited by examiner

WIRELESS COMMUNICATION SYSTEM AND WIRELESS COMMUNICATION METHOD

TECHNICAL FIELD

The present invention relates to a wireless communication system and a wireless communication method for performing beamforming using a variable beam antenna making a beam direction variable.

CROSS-REFERENCE TO RELATED APPLICATION

This application is a National Stage of International Application No. PCT/JP2017/045295, filed on Dec. 18, 2017 and claims priority under 35 U.S.C. § 119 to Japanese Patent Application No. 2017-027041 filed in Japan on Feb. 16, 2017, the entire contents of those applications are hereby incorporated by reference.

BACKGROUND ART

A wireless communication system using a radio wave in a high frequency band such as a millimeter wave band uses a beam antenna having a high gain and sharp directivity in order to compensate for high propagation loss. Generally, a wireless communication system performs beamforming to control a beam direction toward an opposite station as a communication partner, and tracks the beam direction to follow the direction to perform communication. When beamforming is performed, it is necessary to sequentially search for an optimum beam direction between a local station and an opposite station during communication.

A conventional search procedure described in Non-Patent Document 1 will be described with reference to FIG. 9 exemplifying a wireless communication system 7 including three wireless stations shown in FIG. 8. In this example, each of wireless stations 70-1 to 70-3 includes a variable beam antenna and a transceiver at a 60 GHz band. Therefore, the wireless stations 70-1 to 70-3 can vary a sharp beam having a high gain within a range of directions 1 to 4. The variable beam antenna can also form a quasi-omnidirectional beam having a low but nearly uniform gain within the range of directions 1 to 4. Note that the wireless communication system 7 has a star type network topology in which the wireless station 70-1 is a master station, and the wireless stations 70-2 and 70-3 are slave stations.

Part (a) of FIG. 9 is a time chart of signal transmission in the wireless communication system 7. A signal to be transmitted has a cyclic frame structure, and each frame includes a beam direction determination section and a main signal communication section. The beam direction determination section is a section during which a beam direction of a variable beam antenna of each wireless station is determined. The main signal communication section is a section during which communication with a main signal is performed. The main signal is a signal including main information to be transmitted to and from a user of an opposite communication station.

A processing procedure in the beam direction determination section is shown in part (b) of FIG. 9. First, the wireless station 70-1 sequentially changes a direction from direction 1 to direction 4 while the wireless station 70-1 transmits a direction search signal in each beam direction. On the other hand, the wireless station 70-2 defines beam directivity thereof as a quasi-omnidirectional beam and measures a reception condition of the direction search signal transmitted by the wireless station 70-1. Next, the wireless station 70-2 transmits a direction search signal with a beam direction sequentially directed in each of directions 1 to 4. The wireless station 70-1 sets the directivity thereof as a quasi-omnidirectional beam and measures a reception condition of a received direction search signal for each beam direction. At this time, the direction search signal transmitted by the wireless station 70-2 includes transmission direction information of the wireless station 70-1 when the reception condition concerning the direction search signal from the wireless station 70-1 was the best at the wireless station 70-2. The wireless station 70-1 determines a beam direction used for communication with the wireless station 70-2 according to the received direction search signal. The wireless station 70-2 transmits a direction search signal in any one of directions 1 to 4. Thereafter, the wireless station 70-1 notifies the wireless station 70-2 of a transmission direction in which a reception condition is the best among direction search signals from the wireless station 70-2. The wireless station 70-2 determines a beam direction used for communication with the wireless station 70-1 according to this notification. A similar procedure is also performed between the wireless stations 70-1 and 70-3. Therefore, beam directions for all the opposite stations are determined. Since the beam direction determination section appears every constant frame cycle, the beam direction is updated sequentially.

PRIOR ART DOCUMENTS

Patent Documents

[Patent Document 1] Japanese Unexamined Patent Application, First Publication No. 2016-167878

Non-Patent Documents

[Non-Patent Document 1] IEEE Computer Society, IEEE Standard for Information technology-Telecommunications and information exchange between systems Local and metropolitan area networks-Specific requirements, Part 11: Wireless LAN Medium Access Control (MAC) and Physical Layer Specifications Amendment 3: Enhancements for Very High Throughput in the 60 GHz Band, IEEE Std 802.11ad 2012, p. 281-288, 28 Dec. 2012

DISCLOSURE OF INVENTION

Problems to be Solved by the Invention

However, in the conventional method, while a transmitting side transmits a direction search signal, a receiving side needs to wait for arrival of the direction search signal with a quasi-omnidirectional beam. Therefore, the conventional method cannot be applied to a case where wireless stations not having a quasi-omnidirectional beam forming mechanism search for a direction using only a sharp beam having a high gain. In this case, in an initial state where both beam directions are completely unknown, even if the transmitting side transmits a direction search signal in any direction, unless the beam direction on the transmitting side coincides with the beam direction on the receiving side, a wireless station on the receiving side cannot receive the direction search signal. Therefore, it is not possible to search for the beam direction on the transmission side. In order to avoid this, a method for coordinating (negotiating) the beam direction on the receiving side with the transmitting side and performing scanning may also be considered. However, in the initial state, it is difficult to synchronize scanning timings in the beam direction on both sides. As a result, search time may be considerably prolonged.

In the beam direction determination section during which a direction search signal is transmitted and received and a beam direction is determined, a main signal cannot be transmitted. However, in the conventional method, the beam direction determination section needs to be set at a constant frame cycle. This is for changing a beam direction to follow movement of an opposite station or a local station or a change of the direction, and for determining an optimum direction for a wireless station that newly starts communication from an unknown point. Therefore, an average communication speed of a main signal is reduced. As the number of wireless stations performing communication increases, the average communication speed of a main signal is more significantly reduced.

Therefore, as described in Patent Document 1, it is also conceivable to transmit position information of each wireless station using another channel having a frequency different from a millimeter wave band. However, according to the method described in Patent Document 1, a beam direction cannot be determined unless position information or an angle reference of a variable beam antenna can be obtained, and it is difficult to predict an optimum beam direction in a case where communication is performed without using a direct wave.

The present invention has been achieved in view of the above circumstances, and provides a wireless communication system and a wireless communication method capable of reliably determining a beam direction and realizing stable communication of a main signal.

Means for Solving the Problems

A first aspect of the present invention is a wireless communication system including a plurality of wireless stations, in which each of at least two of the plurality of wireless stations includes, a first antenna transmitting a radio wave in a first frequency band, a second antenna transmitting a radio wave in a second frequency band lower in frequency than the first frequency band, a first transceiver transmitting and receiving a main signal in the first frequency band, and a second transceiver transmitting and receiving a control signal in the second frequency band, and at least one of the at least two wireless stations includes, a variable beam antenna making a beam direction variable as the first antenna, a wide angle antenna having a radiation range equal to or wider than a variable range of the beam direction as the second antenna, and a controller controlling the beam direction of the variable beam antenna based on the control signal.

A second aspect of the present invention is the wireless communication system according to the first aspect, in which, when the controller receives information on search for the beam direction as the control signal from another station, the controller searches for a beam direction of a variable beam antenna of a local station thereof.

A third aspect of the present invention is the wireless communication system according to the first or second aspect, in which, when the controller measures a transmission condition of the main signal and the transmission condition is inferior to a predetermined transmission condition, the controller transmits information on search for the beam direction as the control signal to another station.

A fourth aspect of the present invention is the wireless communication system according to any one of the first to third aspects, in which the at least one wireless station includes, a transmission variable beam antenna transmitting a radio wave in the first frequency band and a reception variable beam antenna receiving a radio wave in the first frequency band as the variable beam antenna, and the controller determines a beam direction of the transmission variable beam antenna and a beam direction of the reception variable beam antenna of a local station thereof independently.

A fifth aspect of the present invention is the wireless communication system according to any one of the first to fourth aspects, in which a transmission speed in the second frequency band is lower than that in the first frequency band.

A sixth aspect of the present invention is a wireless communication method in a wireless communication system including a plurality of wireless stations, in which each of at least two of the plurality of wireless stations includes, a first antenna which is configured to transmit a radio wave in a first frequency band, and a second antenna which is configured to transmit a radio wave in a second frequency band lower in frequency than the first frequency band, transmit and receive a main signal in the first frequency band, and transmit and receive a control signal in the second frequency band, and at least one of the at least two wireless stations includes, a variable beam antenna which is configured to make a beam direction variable as the first antenna, and a wide angle antenna having a radiation range equal to or wider than a variable range of the beam direction as the second antenna, and is configured to control the beam direction of the variable beam antenna according to the control signal.

Effects of the Invention

According to the aspects of the present invention, information required controlling the beam direction of the variable beam antenna is transmitted not via the first frequency band in which transmission quality largely changes depending on a positional relationship between the beam direction and a wireless station but via a second frequency band in which constant transmission quality is obtained without largely depending on the beam direction. Therefore, a combination of the beam direction of a local station and the beam direction of a opposite station can be reliably determined regardless of transmission quality in the first frequency band. Therefore, stable communication of a main signal can be realized.

EMBODIMENTS FOR CARRYING OUT THE INVENTION

Hereinafter, embodiments of a wireless communication system and a wireless communication method of the present invention will be described with reference to the drawings.

First Embodiment

First, a configuration example of a wireless communication system according to a first embodiment of the present invention will be described.

Figure 1:
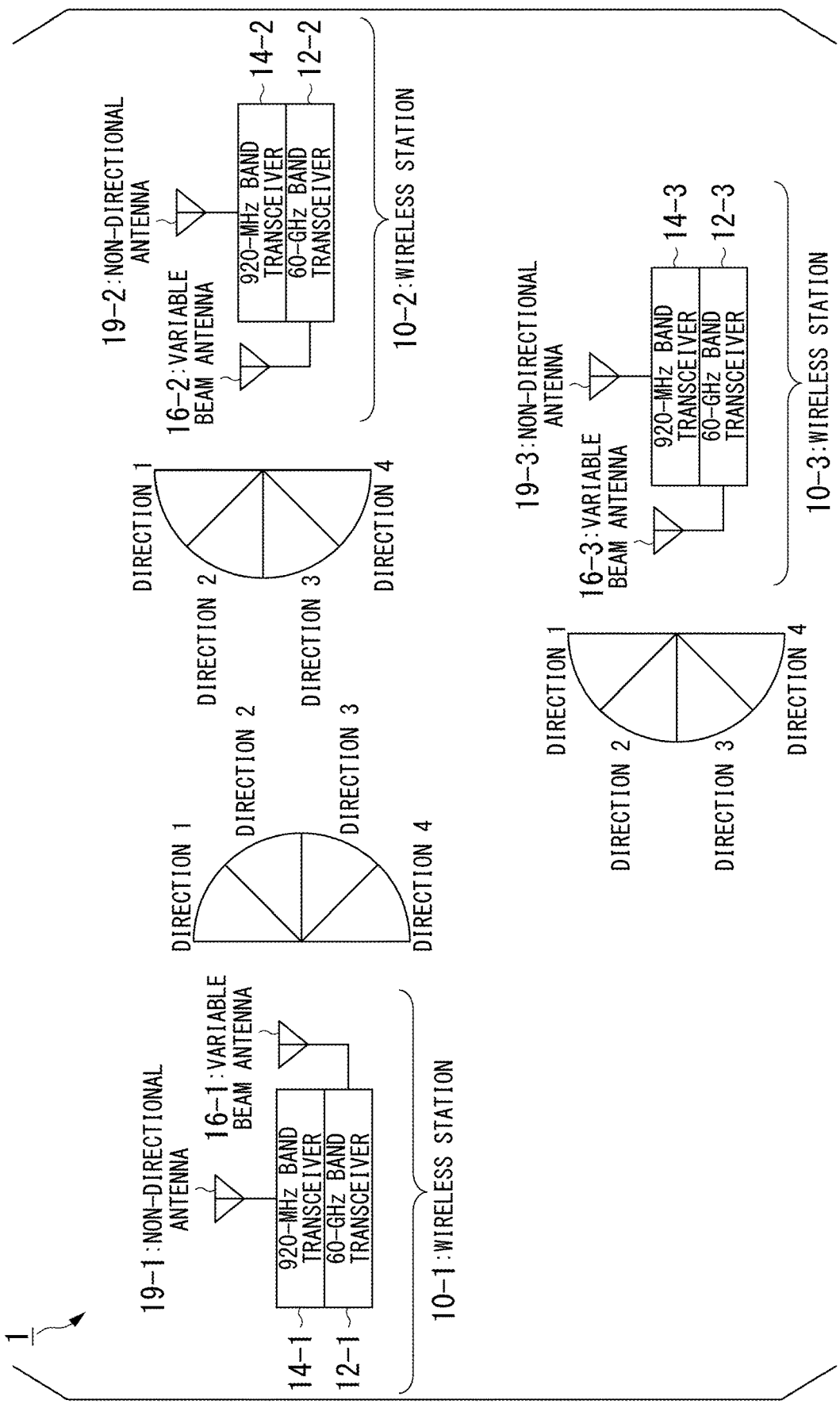
FIG. 1 is a block diagram showing a configuration example of a wireless communication system according to a first embodiment.

FIG. 1 is a block diagram showing the configuration example of the wireless communication system according to the present embodiment.

A wireless communication system 1 includes three wireless stations 10-1 to 10-3. In the example shown in FIG. 1, the wireless communication system has a star type network topology. Among the wireless stations 10-1 to 10-3, the wireless station 10-1 is a master station, and the wireless stations 10-2 and 10-3 are slave stations. Incidentally, when common matters among the wireless stations are described, if the wireless stations are not specified, the wireless stations are collectively referred to as wireless stations 10, and -1 at the end of the reference symbol 10-1 will be omitted.

The wireless stations 10-1 to 10-3 include 60-GHz band transceivers 12-1 to 12-3, 960-MHz band transceivers 14-1 to 14-3, variable beam antennas 16-1 to 16-3, and non-directional antennas 19-1 to 19-3, respectively. The 60-GHz band transceiver 12 transmits and receives a radio wave in a 60 GHz band using the variable beam antenna 16. A radio wave in a 60 GHz band belongs to a millimeter wave having a wavelength of 1 to 10 mm (frequency: 30 to 300 GHz). The millimeter wave has strong rectilinearity and is strongly influenced by absorption and scattering when the millimeter wave is propagated in air. Therefore, in order to receive the millimeter wave with a sufficient electric field intensity, each of the variable beam antennas 16-1 to 16-3 radiates a beam having stronger directivity in a certain direction than in other directions. A direction having the highest radiation intensity in radiation directivity of the beam is referred to as a beam direction. In general, the radiation directivity of the beam corresponds to reception directivity. That is, reception sensitivity of a radio wave coming from the beam direction is higher than reception sensitivity of a radio wave coming from another direction. The 960-MHz band transceiver 14 transmits and receives a radio wave in a 960 MHz band using the non-directional antenna 19. The 960 MHz band belongs to ultra high frequency (UHF) having a wavelength of 10 to 1 m (frequency: 300 MHz to 3 GHz). A radio wave in the UHF band has a lower frequency than a millimeter wave, and therefore does not have strong rectilinearity. A beam having directivity does not necessarily have to be radiated. In the example shown in FIG. 1, the non-directional antennas 19-1 to 19-3 are used for transmitting and receiving a radio wave in the UHF band.

A beam transmitted from a certain wireless station 10-1 may be reflected on a surface of the ground, a building, a structure, or another object and may be received by another wireless station 10-2. Therefore, when the beam direction of the beam transmitted by the wireless station 10-1 coincides with a direction from the wireless station 10-1 to the wireless station 10-2, the reception intensity at the wireless station 10-2 is not necessarily the highest. A propagation path of the beam between the wireless stations 10-1 and 10-2 depends on presence or absence of an object between the wireless stations 10-1 and 10-2 and arrangement thereof. Therefore, the wireless stations 10-1 and 10-2 control the beam direction at predetermined time intervals in order to obtain mutually good reception conditions. In the example shown in FIG. 1, each wireless station determines the beam direction of the variable beam antenna 16 in one of four directions (directions 1 to 4).

(Configuration of Wireless Station)

Next, a configuration of the wireless station 10 according to the present embodiment will be described.

Figure 2:
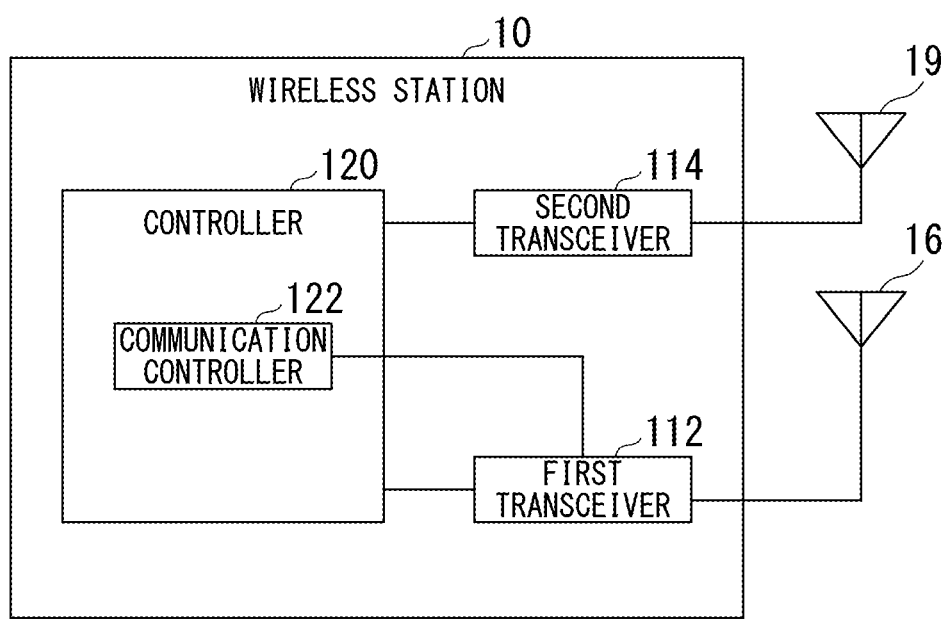
FIG. 2 is a block diagram showing a configuration of a wireless station according to the first embodiment.

FIG. 2 is a block diagram showing a configuration example of the wireless station 10 according to the present embodiment.

The wireless station 10 includes a first transceiver 112, a second transceiver 114, a first antenna 16, a second antenna 19, and a controller 120.

The first transceiver 112 transmits or receives a signal to and from another wireless station 10 with a radio wave in the first frequency band using the first antenna 16. The first transceiver 112 corresponds to the above-described 60-GHz band transceiver 12. The first transceiver 112 feeds a transmission signal in the first frequency band obtained by up-converting a base band transmission signal input from the controller 120 to the first antenna 16. The first transceiver 112 outputs a reception signal in a base band obtained by down-converting a reception signal in the first frequency band input from the first antenna 16 to the controller 120. The first frequency band is a millimeter wave band (for example, 60 GHz band).

The first transceiver 112 controls a beam direction of the first antenna 16 in a beam direction indicated by a direction control signal input from a communication controller 122. The first transceiver 112 includes, for example, a phase shifter as a component for controlling the beam direction. The phase shifter makes the phase of a reception signal or a transmission signal for each antenna element constituting the first antenna 16 variable. When a spacing between antenna elements and a wavelength are predetermined, a phase difference between the antenna elements corresponds to the beam direction. The first transceiver 112 imposes a phase difference corresponding to a beam direction to each of reception signals, combines the reception signals among the antenna elements and obtains a synthesized reception signal to be down-converted. The phase shifter in the first transceiver 112 also imposes a phase difference corresponding to a beam direction to each of distributed, up-converted transmission signals, and supplies the transmission signal to which the phase difference has been applied to each of the antenna elements. Here, the first transceiver 112 may set in advance a data table in which the phase for each antenna element is associated with a beam direction. The first transceiver 112 refers to the set data table and specifies the phase for each antenna element corresponding to a beam direction indicated by a direction control signal.

The second transceiver 114 transmits or receives a signal to and from another wireless station 10 with a radio wave in the second frequency band using the second antenna 19. The second transceiver 114 corresponds to the above-described 960-MHz band transceiver 14. The second transceiver 114 feeds a transmission signal in the second frequency band obtained by up-converting a base band transmission signal input from the controller 120 to the second antenna 19. The second transceiver 114 outputs a reception signal in a base band obtained by down-converting a reception signal in the second frequency band input from the second antenna 19 to the controller 120. The second frequency band only needs to be a frequency band sufficiently lower than the first frequency band (for example, 960 MHz band). The bandwidth (transmission speed) of the second frequency band may be narrower (slower) than the bandwidth (transmission speed) of the first frequency band. The first frequency band is mainly used for transmission of a main signal, whereas the second frequency band is mainly used for transmission of a control signal.

The first antenna 16 transmits or receives a radio wave in the first frequency band as a beam. The first antenna 16 is a variable beam antenna making a beam direction variable. The first antenna 16 corresponds to the above-described variable beam antennas 16-1 to 16-3. The first antenna 16 includes, for example, a plurality of antenna elements as a configuration controlling a beam direction. The plurality of antenna elements are regularly arrayed at predetermined spacing in a line. By aligning the phases of wave fronts of radio waves radiated from the respective antenna elements in a specified beam direction, a beam having a high gain and a narrow width is formed. The array of the antenna elements is, for example, a two-dimensional array. According to the two-dimensional array, it is possible to control a beam direction in each direction in a hemisphere with a normal direction to the array surface of the antenna elements as a central axis. The first antenna 16 is, for example, a microstrip antenna. An example has been described above in which the first antenna 16 and the phase shifter form a phased array to make a beam direction variable, but the present invention is not limited thereto. The first antenna 16 may include, for example, a waveguide element in which a beam direction is fixed and a support which supports the waveguide element and makes the direction thereof mechanically rotatable.

The second antenna 19 transmits or receives a radio wave in the second frequency band. The second antenna 19 is a wide angle antenna having a beam width wider than a predetermined width. The beam width of the second antenna 19 only needs to be equal to or wider than a variable range of a beam direction of the first antenna 16. For example, when the variable range of the beam direction of the first antenna 16 is in each direction within a hemispherical surface, the beam width of the second antenna 19 only needs to be equal to or larger than 180°. The beam width is a range in a radial direction where a radiation intensity equal to or higher than a radiation intensity which is 3 dB lower than a maximum radiation intensity (peak intensity) at which a radiation intensity between directions is maximum is obtained. Therefore, the second antenna 19 may be an omni antenna. The second antenna 19 corresponds to the omni antennas 19-1 to 19-3 shown in FIG. 1. The directivity of the second antenna 19 may be fixed.

The controller 120 includes the communication controller 122. The controller 120 includes, for example, a control device such as a central processing unit (CPU) or an application specific integrated circuit (ASIC). The control device may realize a function thereof by executing processing instructed by a command described in a predetermined control program. The controller 120 may be constituted by a dedicated component.

Figure 3:
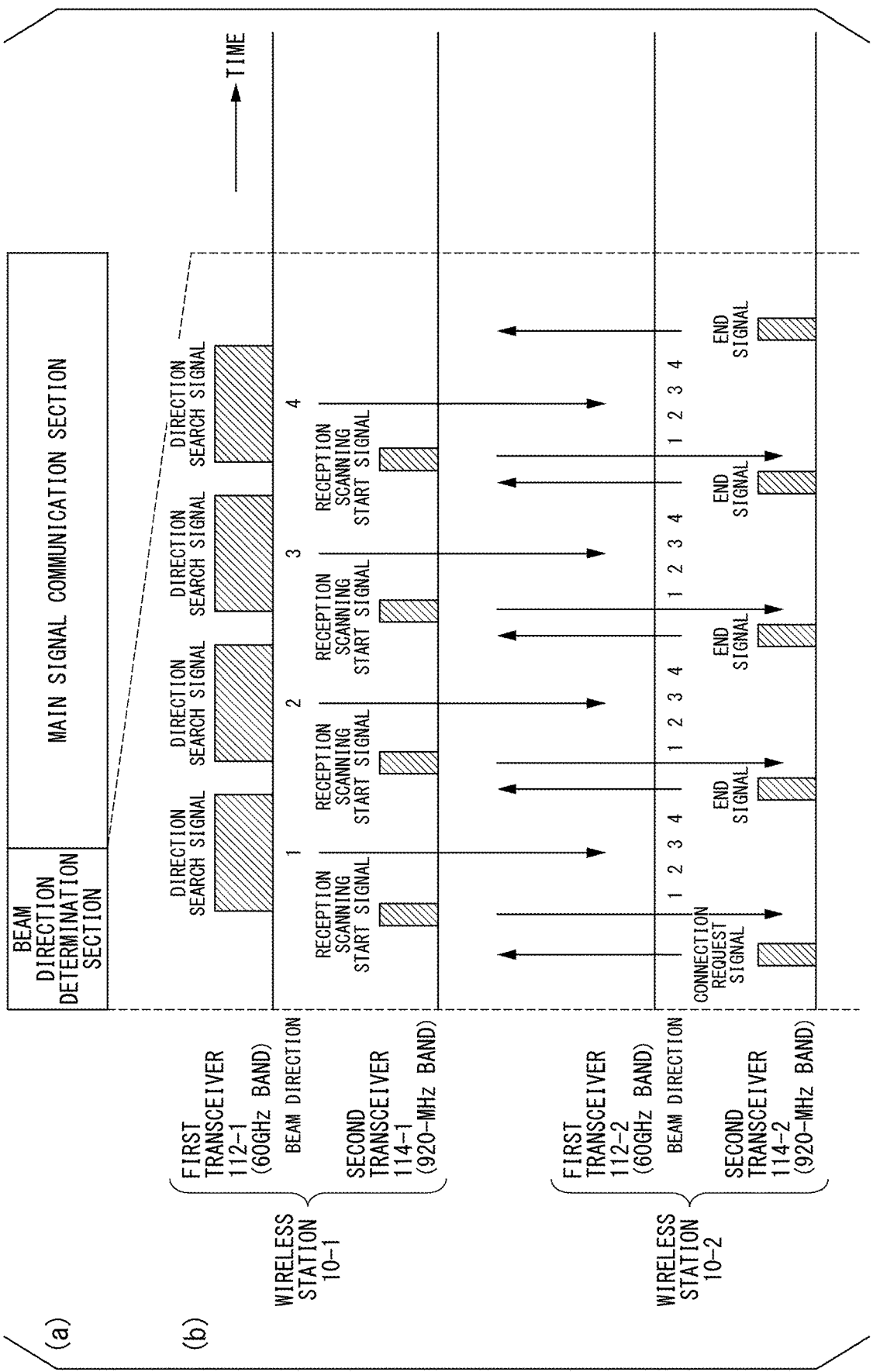
FIG. 3 is a diagram showing an example of a beam direction determination section and a beam direction determination procedure according to the first embodiment.

The communication controller 122 controls communication with another wireless station 10. Hereinafter, processing performed by the communication controller 122 will be described with reference to FIG. 3. FIG. 3 exemplifies control performed between the wireless station 10-1 as a master station and the wireless station 10-2 as a slave station. In the following description, the slave station means a wireless station making a connection request, and the master station means a wireless station accepting a connection request. These stations do not necessarily have to coincide with a role of a wireless station on a network topology. When constituent members of the wireless stations 10-1 and 10-2 are specified, child numbers -1 and -2 are used, respectively. When matters common to the wireless stations 10 are described or the wireless stations 10 are not specified, child numbers are not used. A communication controller 122-2 of the wireless station 10-2 establishes a connection with the wireless station 10-1 in advance via a second transceiver 114-2 using a predetermined communication method. In communication via the second transceiver 114-2, for example, a communication method such as IEEE 802.15.4e or IEEE 802.15.4g can be used. A period during which various signals are transmitted and received between the wireless stations 10-1 and 10-2 includes a beam direction determination section and a main signal communication section as shown in part (a) of FIG. 3. The beam direction determination section is a period during which beam directions of the first antennas 16-1 and 16-2 are mutually determined between the wireless stations 10-1 and 10-2. The main signal communication section is a period during which a main signal is transmitted and received between the wireless stations 10-1 and 10-2. The beam direction determination section and the main signal communication section may be sequentially repeated at a predetermined cycle. A pair of wireless stations 10 performing communication may be changed for every cycle or may be constant. The beam direction determination section may be started only when a connection request is made to start communication.

In the beam direction determination section, the communication controller 122 mutually transmits and receives a control signal determining a beam direction to and from another wireless station via the second transceiver 114. The control signal to be transmitted and received includes a connection request signal, a reception scanning start signal, an end signal, and the like. The connection request signal is a signal indicating a connection request from a slave station to a master station. The reception scanning start signal is a signal to instruct start of scanning in a beam direction from the master station to the slave station. The end signal is a signal that the slave station notifies the master station of an end of scanning in a beam direction in the slave station thereof. The end signal includes information on a beam direction of the slave station in which a reception condition in the slave station is the best and a metric indicating the reception condition. As the metric, reception power, a ratio between a carrier level and an interference noise, a ratio between a signal and an interference noise, a bit error ratio, and the like can be used. The reception power and the ratio between a signal and an interference noise are metrics indicating that a reception condition is better as the values thereof are larger. The bit error ratio is a metric indicating that a reception condition is better as the value thereof is smaller.

As shown in part (b) of FIG. 3, a communication controller 122-1 of the wireless station 10-1 as a master station radiates a direction search signal in a single beam direction from the first antenna 16-1 until the communication controller 122-1 receives an end signal from the wireless station 10-2 as a slave station. For this purpose, the communication controller 122-1 outputs the direction search signal as a transmission signal and information indicating the beam direction as a direction control signal to a first transceiver 112-1. The direction search signal is a reference signal used for measuring a metric. As the direction search signal, a reference signal characteristics of which such as transmission intensity, a frequency component, and a bit sequence are known in advance can be used.

On the other hand, as shown in part (b) of FIG. 3, while a direction search signal is transmitted in a single beam direction from the wireless station 10-1, in order to instruct the first antenna 16-2 to perform scanning in the beam direction, the communication controller 122-2 of the wireless station 10-2 as a slave station sequentially outputs direction control signals indicating different beam directions to a first transceiver 112-2. The scanning in the beam direction is repeated each time the reception scanning start signal is received. Using a reception signal input from the first transceiver 112-2, the communication controller 122-2 measures a metric indicating a reception condition of the reception signal for each beam direction of the first antenna 16-2 of a local station thereof. Thereafter, the communication controller 122-2 compares metrics measured for respective combinations of the beam direction of the wireless station 10-1 and the beam direction of the wireless station 10-2, and determines a combination of the beam direction of the wireless station 10-1 and the beam direction of the wireless station 10-2, corresponding to the best metric. The communication controller 122-2 of the wireless station 10-2 outputs a direction control signal indicating the beam direction of a local station thereof corresponding to the determined combination to the first transceiver 112-2. Therefore, the first antenna 16-2 of the wireless station 10-2 can transmit and receive a radio wave in the first frequency band in the beam direction indicated by the direction control signal. On the other hand, the communication controller 122-1 of the wireless station 10-1 compares metrics indicating the reception condition added to the end signal received from the wireless station 10-2 via a second transceiver 114-1 among beam directions of the wireless station 10-1, and determines a beam direction of the wireless station 10-1 corresponding to the best metric. Therefore, the wireless station 10-1 also specifies the best metric among the metrics measured for respective combinations of the beam direction of the wireless station 10-2 and the beam direction of the wireless station 10-1. The communication controller 122-1 of the wireless station 10-1 outputs a direction control signal indicating the determined beam direction to the first transceiver 112-1. Therefore, the first antenna 16-1 of the wireless station 10-1 can transmit and receive a radio wave in the first frequency band in a beam direction indicated by the direction control signal. An example of the beam direction determination procedure will be described later.

Returning to FIG. 2, the communication controller 122 transmits and receives a main signal to and from an opposite station via the first transceiver 112 in the main signal communication section. The main signal is information to be transmitted by a user of a local station or an opposite station or a signal for carrying the information. The main signal corresponds to, for example, various kinds of data such as an audio signal, a video signal, and a text. The main signal is also referred to as user data. The communication controller 122 transmits a main signal fed to a local station thereof as a transmission signal to an opposite station via the first transceiver 112. The communication controller 122 receives the main signal as a reception signal from the opposite station via the first transceiver 112.

(Beam Direction Determination Procedure)

Next, an example of the beam direction determination procedure according to the present embodiment will be described.

Part (b) of FIG. 3 shows an example of the beam direction determination procedure according to the present embodiment. Part (b) of FIG. 3 exemplifies a case where, on the premise of the following points, in the wireless communication system 1, communication using a 60 GHz band as the first frequency band is requested from the wireless station 10-2 as a slave station to the wireless station 10-1 as a master station.

The second transceiver 114-1 of the wireless station 10-1 and the second transceiver 114-2 of the wireless station 10-2 mutually establish connection in advance using a 920 MHz band as the second frequency band.

The first transceiver 112-1 of the wireless station 10-1 and the first transceiver 112-2 of the wireless station 10-2 can set the beam directions of the first antenna 16-1 and the first antenna 16-2 to any one of four beam directions 1 to 4, respectively.

The number of beam directions that can be set by the first antenna 16-1 of the wireless station 10-1 and the first antenna 16-2 of the wireless station 10-2, and the search order in beam direction search arranged in ascending order of the beam direction numbers are preset in the communication controller 122-1 of the wireless station 10-1 and the communication controller 122-2 of the wireless station 10-2.

A series of procedures from a connection request to determination of the beam direction in the wireless station 10-1 and the beam direction in the wireless station 10-2 are executed within a single beam direction determination section.

First, the communication controller 122-2 of the wireless station 10-2 transmits a connection request signal to the wireless station 10-1 via the second transceiver 114-2.

The communication controller 122-1 of the wireless station 10-1 receives the connection request signal from the wireless station 10-2 via the second transceiver 114-1. A beam direction determination section is started with this connection request signal as a trigger. At this time, the communication controller 122-1 transmits a reception scanning start signal via the second transceiver 114-1 and transmits a direction search signal in beam direction 1 via the first transceiver 112-1 using the first antenna 16-1. When the communication controller 122-1 is transmitting a main signal via the first transceiver 112-1, the communication controller 122-1 stops the transmission. The communication controller 122-1 outputs a direction control signal indicating beam direction 1 to the first transceiver 112-1, and transmits a direction search signal as a transmission signal via the first transceiver 112-1. Therefore, the communication controller 122-1 can cause the wireless station 10-2 to execute beam direction search processing for beam direction 1.

The communication controller 122-2 of the wireless station 10-2 receives a reception scanning start signal via the second transceiver 114-2 and receives a direction search signal from the wireless station 10-1 via the first transceiver 112-2. At this time, the communication controller 122-2 performs beam direction search processing for the first antenna 16-2 of the wireless station 10-2. When the communication controller 122-2 is transmitting a main signal via the first transceiver 112-2, the communication controller 122-2 stops the transmission.

In the beam direction search processing, the communication controller 122-2 measures a metric indicating a reception condition of a direction search signal received via the first transceiver 112-2 for each beam direction of a local station thereof. Therefore, the communication controller 122-2 transmits a direction control signal indicating beam direction 1 to the first transceiver 112-2, and then measures a metric of a direction search signal received via the first transceiver 112-2. The communication controller 122-2 sequentially switches a beam direction to be set in the first transceiver 112-2 to beam directions 2, 3, and 4, and measures a metric for a direction search signal input for each beam direction. Thereafter, the communication controller 122-2 specifies a metric indicating the best reception condition among the measured metrics, and specifies the beam direction corresponding to the specified metric as the beam direction of the wireless station 10-2. The communication controller 122-2 transmits an end signal indicating an end of beam direction search processing in the wireless station 10-2 for beam direction 1 of the wireless station 10-1 to the wireless station 10-1 via the second transceiver 114-2. Information on the specified metric and the beam direction of the wireless station 10-2 are added to this end signal. The communication controller 122-1 of the wireless station 10-1 receives an end signal from the wireless station 10-2 via the second transceiver 114-1.

The communication controller 122-1 of the wireless station 10-1 sequentially switches a beam direction to be set in the first transceiver 112-1 to beam directions 2, 3, 4 for each reception of the end signal, and causes the wireless station 10-2 to execute beam direction search processing for each beam direction. The communication controller 122-2 of the wireless station 10-2 counts the number of times of beam direction search processing that has been completed.

The communication controller 122-1 of the wireless station 10-1 receives an end signal from the wireless station 10-2 for each beam direction of the wireless station 10-1, and counts the number of times the end signal was received.

When the number of times of beam direction search processing that has been completed reaches four, the communication controller 122-2 of the wireless station 10-2 judges that the beam direction search processing has been completed for each beam direction of the wireless station 10-1. At this time, the communication controller 122-2 selects a combination of beam directions to give a metric indicating the best reception condition among the metrics measured for respective combinations of the beam direction of the wireless station 10-1 and the beam direction of the wireless station 10-2. The communication controller 122-2 of the wireless station 10-2 specifies the beam direction of the wireless station 10-2 from the selected combination and outputs a direction control signal indicating the specified beam direction to the first transceiver 112-2. Therefore, the beam direction of the first antenna 16-2 of the wireless station 10-2 is set to the specified direction.

On the other hand, when the number of times of reception of an end signal from the wireless station 10-2 reaches four, the communication controller 122-1 of the wireless station 10-1 judges that the beam direction search processing has been completed for each beam direction of the wireless station 10-1. The communication controller 122-1 stops output of a direction search signal to the first transceiver 112-1 and specifies a beam direction corresponding to a metric indicating the best reception condition among the metrics added to the end signal for each beam direction of the wireless station 10-1. The communication controller 122-1 outputs a direction control signal indicating the specified beam direction of the wireless station 10-1 to the first transceiver 112-1. Therefore, the beam direction of the first antenna 16-1 of the wireless station 10-1 is set to the specified direction.

Thereafter, the communication controller 122-1 of the wireless station 10-1 and the communication controller 122-2 of the wireless station 10-2 start mutual communication of a main signal via the first transceiver 112-1 of the communication controller 122-1 and the first transceiver 112-2 of the communication controller 122-2. Therefore, the beam direction determination section ends and the main signal communication section is started.

(Start of Communication by Another Wireless Station)

The above-described beam direction determination procedure may be executed in a pair other than the pair of the wireless stations 10-1 and 10-2. For example, during communication of a main signal between the wireless stations 10-1 and 10-2, when a wireless station 10-3 other than the wireless stations 10-1 and 10-2 in communication requests communication with the wireless station 10-1, the beam direction determination procedure may be started.

Figure 4:
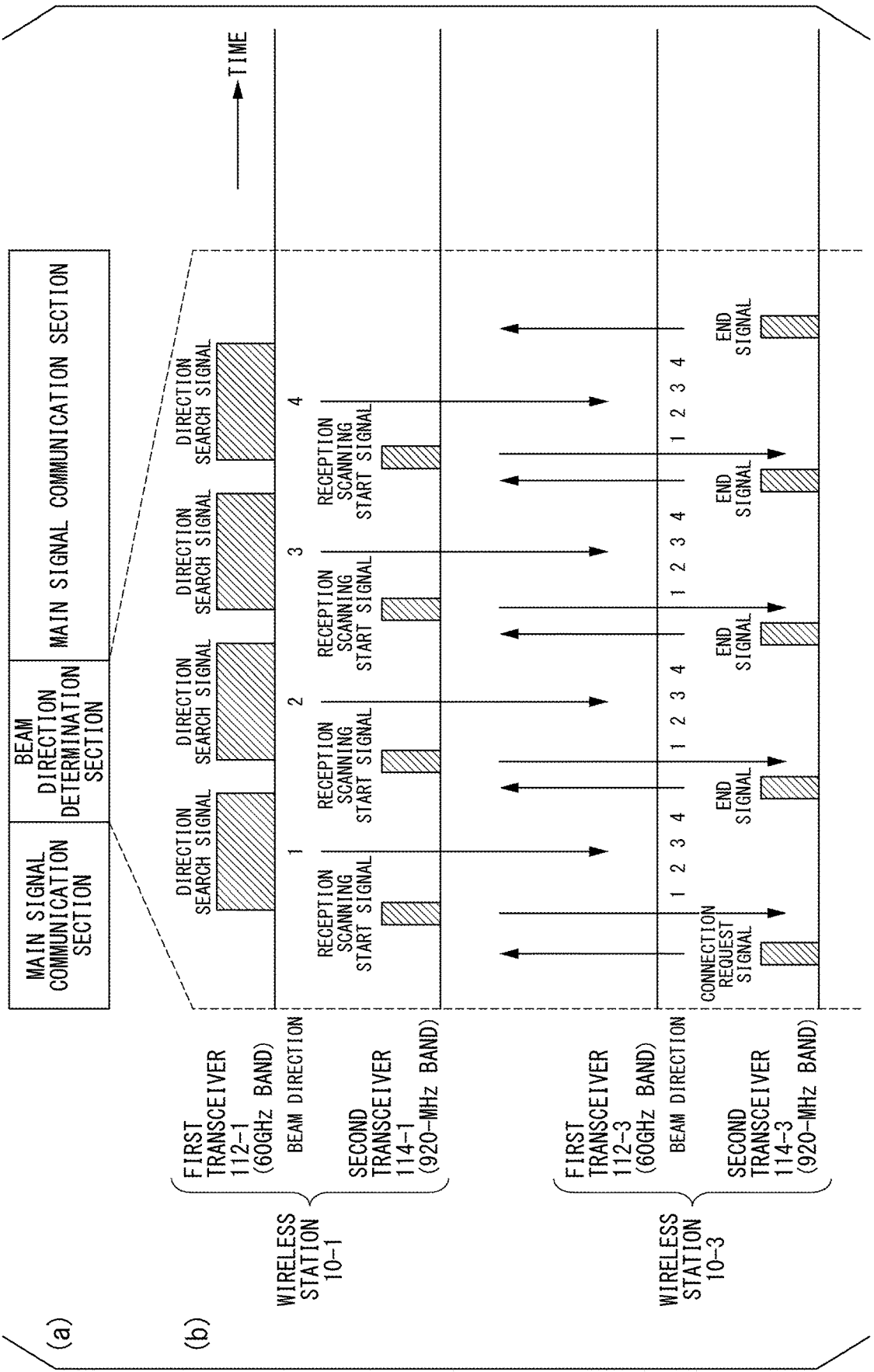
FIG. 4 is a diagram showing another example of the beam direction determination section and the beam direction determination procedure according to the first embodiment.

At this time, as shown in part (b) of FIG. 4, a communication controller 122-3 of the wireless station 10-3 transmits a connection request signal to the wireless station 10-1 via a second transceiver 114-3. The communication controller 122-1 of the wireless station 10-1 receives the connection request signal from the wireless station 10-3 via the second transceiver 114-1. In response to the reception of the connection request signal, the communication controller 122-1 of the wireless station 10-1 stops transmission of a main signal to the wireless station 10-2 via the first transceiver 112-1 and reception of the main signal from the wireless station 10-2. Thereafter, the above-described beam direction determination procedure is executed with the wireless station 10-3. According to the beam direction determination procedure, each of the communication controller 122-3 of the wireless station 10-3 and the communication controller 122-1 of the wireless station 10-1 determines a combination of the beam direction of the wireless station 10-1 and the beam direction of the wireless station 10-3 as a combination corresponding to a metric indicating the best reception condition. Thereafter, the communication controller 122-3 of the wireless station 10-3 and the communication controller 122-1 of the wireless station 10-1 start transmission and reception of a main signal in a beam direction specified for each wireless station via a first transceiver 112-3 and the first transceiver 112-1, respectively.

As described above, the wireless communication system 1 according to the present embodiment includes the plurality of wireless stations 10. Each of at least two wireless stations 10 among the plurality of wireless stations 10 includes, the first transceiver 112 transmitting a main signal in the first frequency band, and the second transceiver 114 transmitting a control signal in the second frequency band lower in frequency than the first frequency band. Each of the at least two wireless stations 10 includes, the first antenna 16 transmitting a radio wave in the first frequency band and making a beam direction variable, the second antenna 19 transmitting a radio wave in the second frequency band and having a radiation range equal to or wider than a variable range of the beam direction of the first antenna 16, and the communication controller 122 controlling the beam direction of the first antenna according to a control signal.

According to this configuration, information required controlling the beam direction of the first antenna 16 is transmitted not via the first frequency band in which transmission quality largely changes depending on a positional relationship between the beam direction and the wireless station 10 but via the second frequency band in which constant transmission quality is obtained without largely depending on the beam direction.

Therefore, a combination of the beam direction of a local station and the beam direction of an opposite station can be reliably determined regardless of transmission quality in the first frequency band. For example, even if the line is disconnected or the signal intensity is reduced due to an opposite station being out of a beam direction of a local station, the beam direction can be promptly updated, and communication can be restored.

In addition, a control signal using the second frequency band makes it possible to transmit and receive a direction search signal transmitted in the first frequency band at a timing required for beam direction search. When a beam direction search is required, for example, when a new wireless station 10 starts communication, transmission of a main signal is interrupted, and a direction search signal is transmitted. Otherwise, transmission of the main signal can be continued. Therefore, it is possible to suppress average communication speed reduction of the main signal.

In addition, since frequency of the second frequency band is lower than that of the first frequency band, propagation loss per unit distance in the second frequency band is smaller than that in the first frequency band. Therefore, even if the second antenna 19 is a wide angle antenna having a low gain, the second antenna 19 can secure a control signal to reach a position apart by a distance equal to or larger than that of a main signal transmitted using the first antenna 16 having a high gain with lower transmission power than that for the main signal.

In addition, since the transmission speed in the second frequency band is set to be lower than that in the first frequency band, a margin against a propagation loss increases. Therefore, even if the second antenna 19 is a wide angle antenna having a low gain, the second antenna 19 can secure a signal to reach a position apart by a distance equal to or larger than that of a main signal transmitted using the first antenna 16 having a high gain with still lower transmission power than that for the main signal.

Second Embodiment

Next, a second embodiment of the present invention will be described. The following description will mainly focus on a difference from the above embodiment. The same reference symbols will be given to the same constituent members as those of the above embodiment, and description thereof will be referred to.

Figure 5:
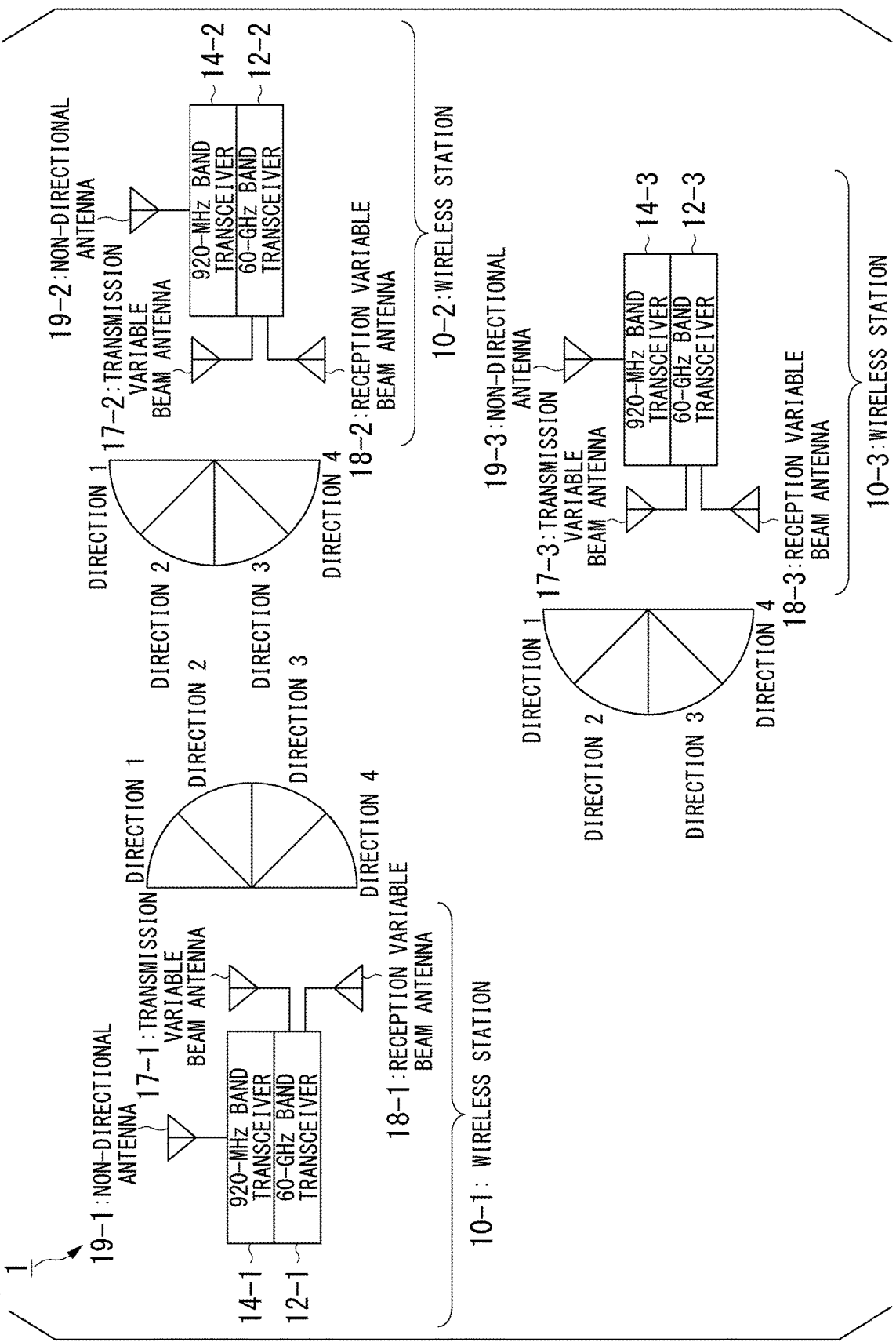
FIG. 5 is a block diagram showing a configuration example of a wireless communication system according to a second embodiment.

FIG. 5 is a block diagram showing a configuration example of a wireless communication system according to the present embodiment.

Wireless stations 10-1 to 10-3 constituting a wireless communication system 1 includes a pair of transmission variable beam antenna 17-1 and reception variable beam antenna 18-1, a pair of transmission variable beam antenna 17-2 and reception variable beam antenna 18-2, and a pair of transmission variable beam antenna 17-3 and reception variable beam antenna 18-3 in place of the variable beam antennas 16-1 to 16-3, respectively. Each of the transmission variable beam antennas 17-1 to 17-3 is a variable beam antenna transmitting a beam of a radio wave carrying a transmission signal. Each of the reception variable beam antennas 18-1 to 18-3 is a variable beam antenna receiving a radio wave carrying a reception signal. In the present embodiment, each of a combination of the reception variable beam antenna 18-1 of the wireless station 10-1 as a master station and the transmission variable beam antenna 17-2 of the wireless station 10-2 as a slave station serving as a counterpart thereof, and a combination of the reception variable beam antenna 18-2 of the wireless station 10-2 and the transmission variable beam antenna 17-1 of the wireless station 10-1 performs beam direction search processing. In the following description, beam direction search processing corresponding to the combination of the transmission variable beam antenna 17-1 of the wireless station 10-1 and the reception variable beam antenna 18-2 of the wireless station 10-2 will be referred to as reception scanning, and beam direction search processing corresponding to the transmission variable beam antenna 17-2 of the wireless station 10-2 and the reception variable beam antenna 18-1 of the wireless station 10-1 will be referred to as transmission scanning.

(Configuration of Wireless Station)

Next, a configuration of the wireless station 10 according to the present embodiment will be described.

Figure 6:
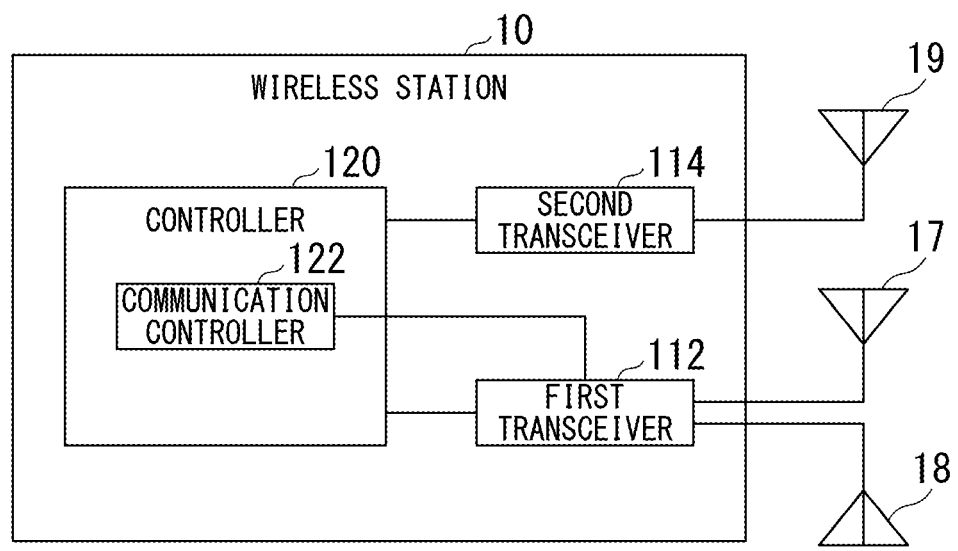
FIG. 6 is a block diagram showing a configuration example of a wireless station according to the second embodiment.

FIG. 6 is a block diagram showing a configuration example of the wireless station 10 according to the present embodiment.

The wireless station 10 includes a first transceiver 112, a second transceiver 114, a transmission variable beam antenna 17, a reception variable beam antenna 18, and a controller 120.

The transmission variable beam antenna 17 is a variable beam antenna transmitting a radio wave in the first frequency band as a beam. The transmission variable beam antenna 17 corresponds to the above-described transmission variable beam antennas 17-1 to 17-3.

The reception variable beam antenna 18 is a variable beam antenna receiving a radio wave in the first frequency band as a beam. The reception variable beam antenna 18 corresponds to the above-described reception variable beam antennas 18-1 to 18-3.

Each of the transmission variable beam antenna 17 and the reception variable beam antenna 18 may have a configuration similar to the first antenna 16.

The first transceiver 112 transmits a transmission signal to another wireless station 10 with a radio wave of the first frequency using the transmission variable beam antenna 17. In addition, the first transceiver 112 receives a reception signal carried with a radio wave of the first frequency coming from the other wireless station 10 to the reception variable beam antenna 18.

The first transceiver 112 can independently set the beam direction of each of the transmission variable beam antenna 17 and the reception variable beam antenna 18. In the following description, the beam directions set for the transmission variable beam antenna 17 and the reception variable beam antenna 18 are referred to as a transmission beam direction and a reception beam direction, respectively. The first transceiver 112 controls a beam direction for the transmission variable beam antenna 17 to transmit a radio wave in a transmission beam direction indicated by a direction control signal input from a communication controller 122. In addition, the first transceiver 112 controls a beam direction for the reception variable beam antenna 18 to receive a radio wave in a reception beam direction indicated by a direction control signal input from the communication controller 122.

Next, processing performed by the communication controller 122 will be described with reference to FIG. 7. FIG.

7 exemplifies control performed between the wireless station 10-1 as a master station and the wireless station 10-2 as a slave station. Each of the communication controller 122-1 of the wireless station 10-1 and the communication controller 122-2 of the wireless station 10-2 controls beam direction search processing for each of a combination of the reception variable beam antenna 18 of a local station thereof and the transmission variable beam antenna 17 of an opposite station, and a combination of the reception variable beam antenna 18 of the opposite station and the transmission variable beam antenna 17 of a local station thereof. As shown in part (b) of FIG. 7, the communication controllers 122-1 and 122-2 mutually transmit and receive, as a control signal, a connection request signal, a reception scanning start signal, and an end signal as well as a transmission scanning start signal, a transmission scanning update signal, a confirmation signal, and a transmission scanning end signal to and from a opposite station via the second transceiver 114. The reception scanning start signal and the end signal are control signals used for reception scanning. The procedure of this reception scanning corresponds to a procedure obtained by applying the procedure of beam direction search processing described in the first embodiment to search for a combination of the reception beam direction in the wireless station 10-2 as a slave station and the transmission beam direction in the wireless station 10-1 as a master station. Therefore, the description of the first embodiment will be referred to for the procedure of reception scanning.

On the other hand, the transmission scanning start signal, the transmission scanning update signal, the confirmation signal, and the transmission scanning end signal are control signals used for transmission scanning. The transmission scanning start signal is a signal indicating start of transmission scanning from a master station to a slave station. The confirmation signal is a signal indicating confirmation of reception of a transmission scanning start signal or a transmission scanning update signal from a master station in a slave station, and start of scanning in the reception beam direction in the master station from the slave station to the master station. Information indicating the transmission beam direction of the slave station may be added to the confirmation signal. The transmission scanning update signal is a signal indicating an instruction to update the transmission beam direction from the master station to the slave station. The transmission scanning end signal is a signal indicating an end of transmission scanning from the master station to the slave station. Information on a reception beam direction of the master station with the best reception condition in scanning of the reception beam direction most recently performed and a metric indicating the reception condition are added to the transmission scanning update signal and the transmission scanning end signal.

Figure 7:
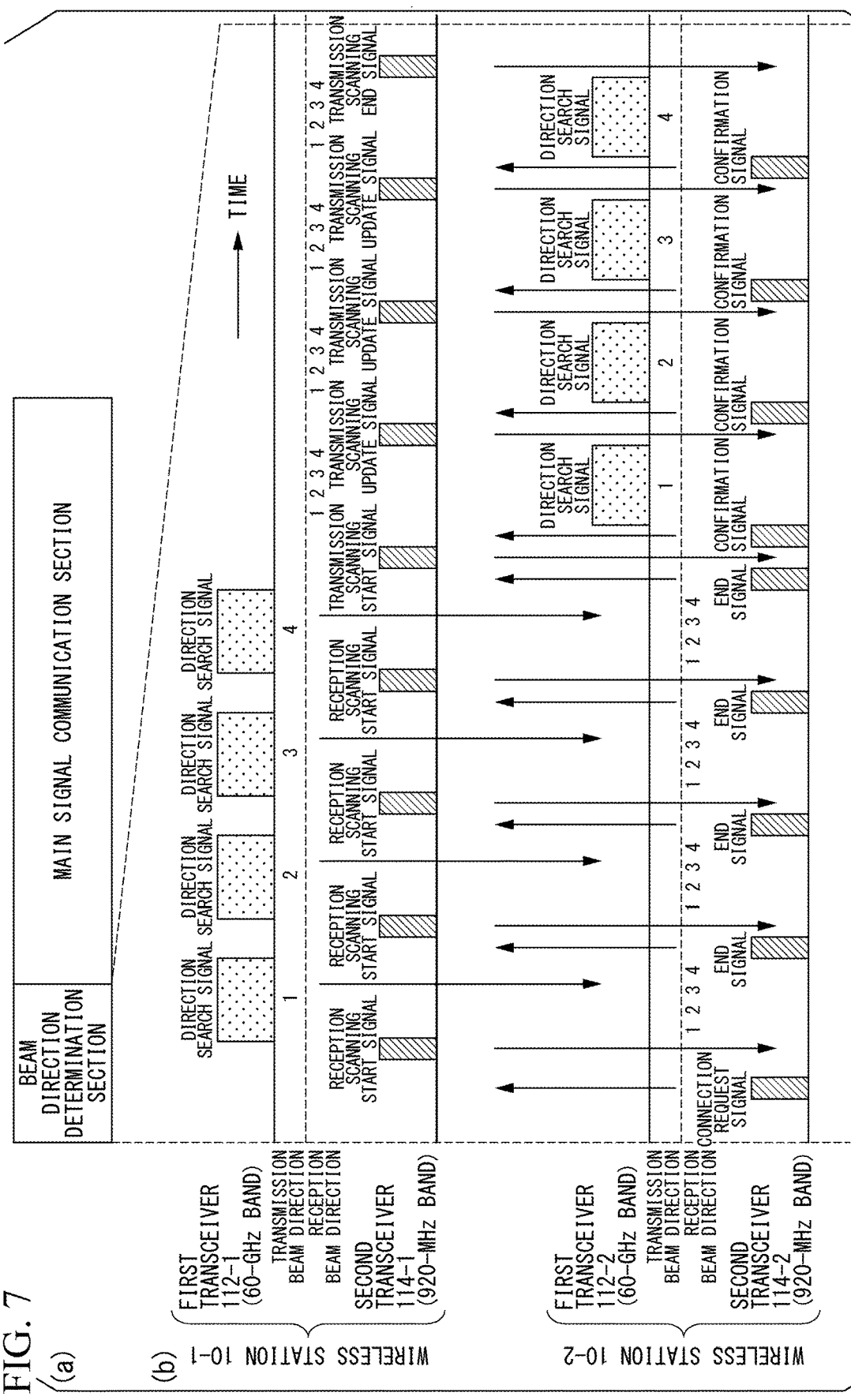
FIG. 7 is a diagram showing an example of a beam direction determination section and a beam direction determination procedure according to the second embodiment.
Figure 8:
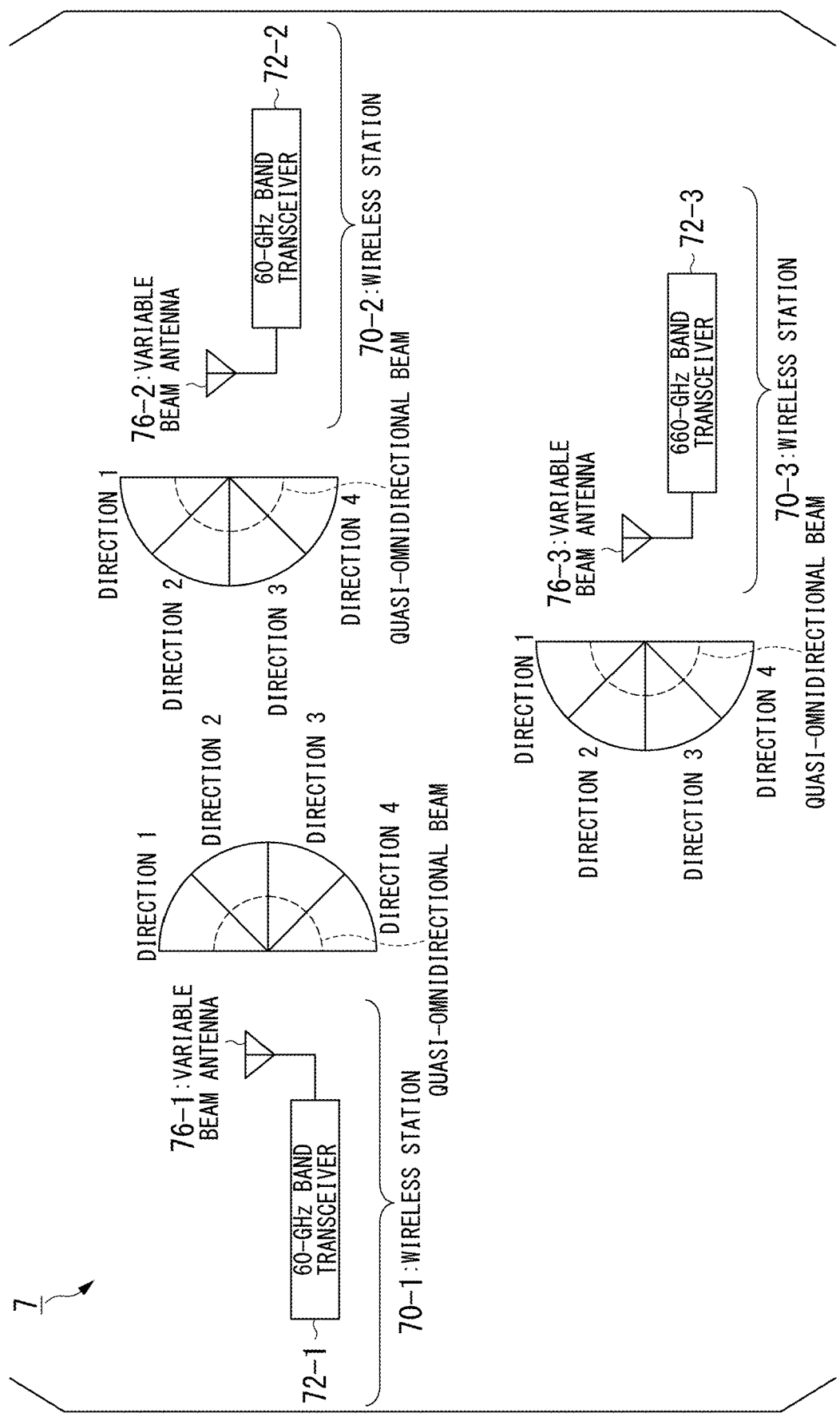
FIG. 8 is a block diagram showing a configuration example of a conventional wireless communication system.
Figure 9:
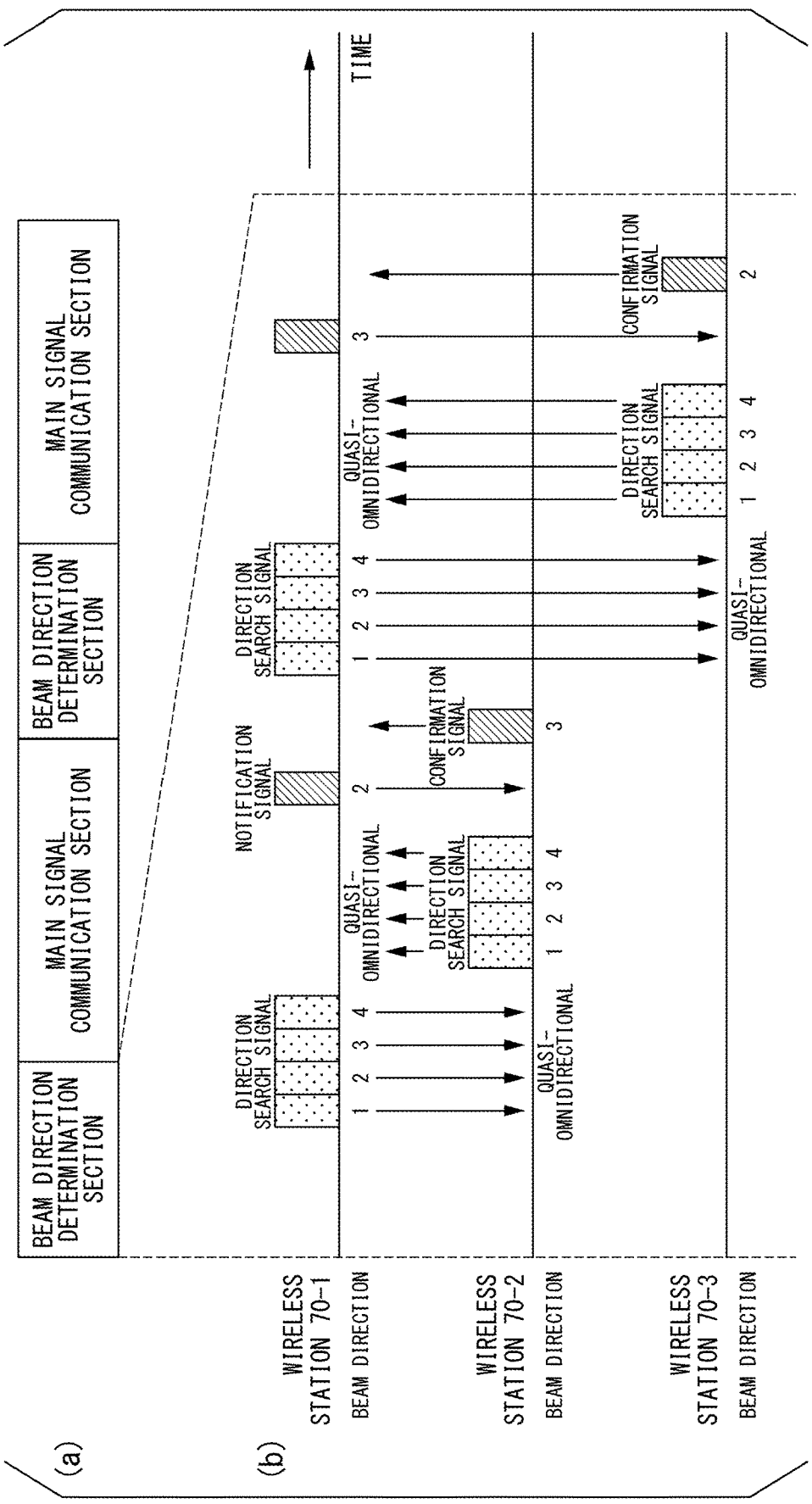
FIG. 9 is a diagram showing an example of a conventional beam direction determination procedure.

In transmission scanning, as shown in part (b) of FIG. 7, the communication controller 122-2 of the wireless station 10-2 as a slave station transmits a direction search signal in a single transmission beam direction from the transmission variable beam antenna 17-2 of a local station thereof for each single scanning in a reception beam direction in the wireless station 10-1 as a master station. Therefore, the communication controller 122-2 of the wireless station 10-2 transmits the direction search signal as a transmission signal and information indicating a transmission beam direction of the transmission signal as a direction control signal to the first transceiver 112-2.

The communication controller 122-1 of the wireless station 10-1 as a master station sequentially outputs a direction control signal indicating the reception beam direction of the reception variable beam antenna 18-1 to the first transceiver 112-1 such that the reception beam direction of a local station thereof makes a round while the direction search signal is transmitted from the wireless station 10-2 to a single beam direction. The scanning in the reception beam direction is repeated for each transmission beam direction of the wireless station 10-2. Thereafter, the communication controller 122-1 compares metrics measured for respective combinations of the reception beam direction of the wireless station 10-1 and the transmission beam direction of the wireless station 10-2, and determines a combination of the reception beam direction of the wireless station 10-1 and the transmission beam direction of the wireless station 10-2, corresponding to a metric having the best reception condition. The communication controller 122-1 outputs a direction control signal indicating the reception beam direction of the wireless station 10-1 corresponding to the determined combination to the first transceiver 112-1. Therefore, the reception variable beam antenna 18-1 of the wireless station 10-1 can receive a radio wave in the first frequency band in a reception beam direction indicated by the direction control signal.

On the other hand, the communication controller 122-2 of the wireless station 10-2 compares metrics indicating the reception condition added to the transmission scanning update signal and the transmission scanning end signal received from the wireless station 10-1 via the second transceiver 114-2 among the transmission beam directions of a local station thereof, and determines a transmission beam direction of a local station thereof corresponding to the best metric. Therefore, also for the transmission beam direction, a metric with the best reception condition is specified among the metrics measured for respective combinations of the reception beam direction of an opposite station and the transmission beam direction of a local station. The communication controller 122-2 of the wireless station 10-2 outputs a direction control signal indicating the determined transmission beam direction to the first transceiver 112-2. Therefore, the transmission variable beam antenna 17-2 of the wireless station 10-2 can transmit a radio wave in the first frequency band in a transmission beam direction indicated by a direction control signal.

(Beam Direction Determination Procedure)

Next, an example of the beam direction determination procedure according to the present embodiment will be described.

Part (b) of FIG. 7 shows an example of the beam direction determination procedure according to the present embodiment. Part (b) of FIG. 7 exemplifies a case where, in the wireless communication system 1, communication using a 60 GHz band as the first frequency band is requested from the wireless station 10-2 as a slave station to the wireless station 10-1 as a master station.

First, the communication controller 122-2 of the wireless station 10-2 transmits a connection request signal to the wireless station 10-1 via the second transceiver 114-2.

The communication controller 122-1 of the wireless station 10-1 receives the connection request signal from the wireless station 10-2 via the second transceiver 114-1. A beam direction determination section is started with this connection request signal as a trigger, and the wireless stations 10-1 and 10-2 perform reception scanning. Here, the communication controller 122-1 transmits a reception scanning start signal via the second transceiver 114-1 and transmits a direction search signal in transmission beam direction 1 via the first transceiver 112-1 using the transmission variable beam antenna 17-1.

The communication controller 122-2 of the wireless station 10-2 receives a direction search signal via the first transceiver 112-2, and performs beam direction search processing for the reception variable beam antenna 18-2 of a local station thereof. The communication controller 122-2 sequentially switches a reception beam direction to be set in the first transceiver 112-2 to reception beam directions 1, 2, 3, and 4, and measures a metric for a direction search signal received for each reception beam direction. Thereafter, the communication controller 122-2 specifies a reception beam direction of the wireless station 10-2, corresponding to a metric indicating the best reception condition among the measured metrics. The communication controller 122-2 transmits an end signal indicating an end of beam direction search processing of the reception beam direction in the wireless station 10-2 for transmission beam direction 1 to the wireless station 10-1 via the second transceiver 114-2. Information on the specified metric and the reception beam direction of the wireless station 10-2 are added to this end signal. The communication controller 122-1 of the wireless station 10-1 receives an end signal from the wireless station 10-2 via the second transceiver 114-1.

The communication controller 122-1 of the wireless station 10-1 sequentially switches a transmission beam direction to be set in the first transceiver 112-1 to transmission beam directions 2, 3, 4 for each reception of an end signal, and causes the wireless station 10-2 to execute beam direction search processing of a reception beam direction for each transmission beam direction. The communication controller 122-1 of the wireless station 10-1 receives an end signal from the wireless station 10-2 for each transmission beam direction of the wireless station 10-1.

When judging that beam direction search processing of a reception beam has been completed for each transmission beam direction of the wireless station 10-1, the communication controller 122-2 of the wireless station 10-2 selects a combination of a transmission beam direction of the wireless station 10-1 and a reception beam direction of the wireless station 10-2 to give the best metric among the metrics measured for respective combinations of the transmission beam direction of the wireless station 10-1 and the reception beam direction of the wireless station 10-2. The communication controller 122-2 specifies a reception direction of the wireless station 10-2 corresponding to the selected combination.

On the other hand, when judging that beam direction search processing has been completed for each transmission beam direction of the wireless station 10-1, the communication controller 122-1 of the wireless station 10-1 stops transmission of a direction search signal to the first transceiver 112-1, specifies a metric indicating the best reception condition among the metrics added to the end signal related to each transmission beam direction of the wireless station 10-1, and specifies a transmission beam direction of the wireless station 10-1 corresponding to the specified metric. As a result, reception scanning ends.

Thereafter, the communication controller 122-1 of the wireless station 10-1 transmits a transmission scanning start signal to the wireless station 10-2 via the second transceiver 114-1. The wireless stations 10-1 and 10-2 start transmission scanning with this transmission scanning start signal as a trigger.

The communication controller 122-2 of the wireless station 10-2 receives a transmission scanning start signal from the wireless station 10-1 via the second transceiver 114-2. At this time, the communication controller 122-2 transmits a confirmation signal indicating confirmation of start of scanning in a reception beam direction in the wireless station 10-2 via the second transceiver 114-2, and transmits a direction search signal to the transmission variable beam antenna 17-2 in transmission beam direction 1 via the first transceiver 112-2. Therefore, the communication controller 122-2 can cause the wireless station 10-1 to execute beam direction search processing of a reception beam direction for transmission beam direction 1 of the wireless station 10-2.

The communication controller 122-1 of the wireless station 10-1 receives a confirmation signal from the wireless station 10-2 via the second transceiver 114-1. The communication controller 122-1 performs beam direction search processing for the reception beam direction of the wireless station 10-1 with this confirmation signal as a trigger. The communication controller 122-1 sequentially switches a reception beam direction to be set in the first transceiver 112-2 to reception beam directions 1, 2, 3, and 4, and measures a metric for a direction search signal received for each reception beam direction. Thereafter, the communication controller 122-1 specifies a reception beam direction of the wireless station 10-1, corresponding to a metric indicating the best reception condition among the measured metrics. The communication controller 122-1 transmits a transmission scanning update signal to the wireless station 10-2 via the second transceiver 114-1. Information on the specified metric and the reception beam direction of the wireless station 10-1 are added to this transmission scanning update signal. The communication controller 122-2 of the wireless station 10-2 receives a transmission scanning update signal from the wireless station 10-1 via the second transceiver 114-2.

On the other hand, the communication controller 122-2 of the wireless station 10-2 sequentially switches a transmission beam direction to be set in the first transceiver 112-2 to transmission beam directions 2, 3, and 4 for each reception of a transmission scanning update signal, and causes the wireless station 10-1 to execute beam direction search processing of a reception beam direction for each transmission beam direction. The communication controller 122-1 of the wireless station 10-1 counts the number of times of beam direction search processing that has been completed. When the number of times of beam direction search processing that has been completed in a reception beam direction reaches four, the communication controller 122-1 of the wireless station 10-1 judges that the beam direction search processing of a reception beam direction of the wireless station 10-1, that is, transmission scanning has been completed for each transmission beam direction of the wireless station 10-2. At this time, the communication controller 122-1 transmits a transmission scanning end signal in place of a transmission scanning update signal to the wireless station 10-2 via the second transceiver 114-1. Information on the specified metric and the reception beam direction of the wireless station 10-1 specified by beam direction search processing most recently executed are added to this transmission scanning end signal.

The communication controller 122-1 of the wireless station 10-1 selects a combination of the transmission beam direction of the wireless station 10-2 and the reception beam direction of the wireless station 10-1 to give a metric indicating the best reception condition among the metrics measured for respective combinations of the transmission beam direction of the wireless station 10-2 and the reception beam direction of the wireless station 10-1. The communication controller 122-1 specifies the reception beam direction of the wireless station 10-1 according to the selected combination. The communication controller 122-1 outputs a direction control signal indicating the transmission beam direction of the wireless station 10-1 specified in reception scanning and a direction control signal indicating the reception beam direction of the wireless station 10-1 specified in transmission scanning to the first transceiver 112-1. Therefore, the transmission beam direction and the reception beam direction are set as the beam direction of the transmission variable beam antenna 17-1 of the wireless station 10-1 and the beam direction of the reception variable beam antenna 18-1 thereof, respectively.

On the other hand, when receiving a transmission scanning end signal from the wireless station 10-1 via the second transceiver 114-2, the communication controller 122-2 of the wireless station 10-2 judges that the beam direction search processing of the reception beam direction of the wireless station 10-1, that is, transmission scanning has been completed for each transmission beam direction of the wireless station 10-2. The communication controller 122-2 stops output of a direction search signal to the first transceiver 112-2 and specifies a transmission beam direction of the wireless station 10-2 corresponding to a metric indicating the best reception condition among the metrics added to the transmission scanning update signal or the transmission scanning end signal related to each transmission beam direction of the wireless station 10-2. The communication controller 122-2 outputs a direction control signal indicating the reception beam direction of the wireless station 10-2 specified in reception scanning and a direction control signal indicating the transmission beam direction of the wireless station 10-2 specified in transmission scanning to the first transceiver 112-2. Therefore, the reception beam direction and the transmission beam direction are set as the beam direction of the reception variable beam antenna 18-2 of the wireless station 10-2 and the beam direction of the transmission variable beam antenna 17-2 thereof, respectively.

Thereafter, the communication controller 122-1 of the wireless station 10-1 and the communication controller 122-2 of the wireless station 10-2 start mutual communication of a main signal via the first transceiver 112-1 of the communication controller 122-1 and the first transceiver 112-2 of the communication controller 122-2.

Incidentally, also in the present embodiment, during communication of a main signal in the two wireless stations, two wireless stations in another combination may execute the beam direction determination procedure described with reference to FIG. 7, and then the two wireless stations in the combination may start communication of a main signal (see FIG. 4).

As described above, in the wireless communication system 1 according to the present embodiment, each of the at least two wireless stations 10 includes the transmission variable beam antenna 17 transmitting a radio wave in the first frequency band and the reception variable beam antenna 18 receiving a radio wave in the first frequency band. The communication controller 122 determines a combination of beam directions related to the best transmission condition among transmission conditions for respective combinations of the beam direction of the transmission variable beam antenna 17 of another station and the beam direction of the reception variable beam antenna 18 of a local station thereof.

Therefore, a combination of beam directions related to the best transmission condition is determined independently for each of a transmission path from a local station to another station and a transmission path from another station to the local station, and a main signal is transmitted between the local station and another station in the first frequency band using the determined combination of beam directions. In general, a propagation condition of a radio wave in the first frequency band having a short wavelength changes sensitively with a change in installation position of an antenna. Therefore, the transmission condition is better than that in a case where a common transmission path is used for transmission of a signal from a local station to another station and transmission from another station to the local station.

(Modification)

Hereinabove, the embodiments of the present invention have been described with reference to the drawings. However, specific configurations and control procedures are not limited to those described above, and various design changes and the like may be made without departing from the gist of the present invention.

In the examples shown in FIGS. 3, 4, and 7, within a single beam direction determination section with a connection request signal as a trigger, the beam direction of a wireless station transmitting a direction search signal is sequentially changed, beam direction search processing is performed for each beam direction, and a metric indicating a reception condition is measured for each of all the combinations of the beam direction of one wireless station and the beam direction of the other wireless station. However, the present invention is not limited thereto. The beam direction search processing may be executed intermittently for each beam direction of a wireless station transmitting a direction search signal during communication of a main signal.

That is, in the example shown in FIGS. 3 and 7, the timing at which the communication controller 122-1 of the wireless station 10-1 transmits a reception scanning start signal does not necessarily have to be immediately after reception of a connection request signal or an end signal from the wireless station 10-2. A main signal communication section having a predetermined period of time may be set between reception of the connection request signal or the end signal and transmission of a subsequent reception scanning start signal. However, when transmitting the reception scanning start signal, the communication controller 122-1 adds information indicating the beam direction of a local station thereof related to transmission of a direction search signal to the reception scanning start signal, and stops transmission of a main signal. The order of the beam directions selected for each beam direction determination may be arbitrary as long as the beam direction of a local station is a beam direction in which beam direction search processing has not been executed yet. As a result, the communication controller 122-2 of the wireless station 10-2 is notified of a beam direction related to transmission of a direction search signal by the information added to the reception scanning start signal received from the wireless station 10-1. The communication controller 122-2 of the wireless station 10-2 transmits an end signal to the wireless station 10-1 for the beam direction of which the communication controller 122-2 has been notified after executing the beam direction search processing. Therefore, the communication controller 122-1 of the wireless station 10-1 and the communication controller 122-2 of the wireless station 10-2 share information on the beam direction related to transmission of the direction search signal that has been subjected to beam direction search processing.

In the example shown in FIG. 7, the timing at which the communication controller 122-2 of the wireless station 10-2 transmits a confirmation signal does not have to be immediately after reception of the transmission scanning start signal or the transmission scanning update signal from the wireless station 10-1. A main signal communication section having a predetermined period of time may be set between reception of the transmission scanning start signal or the transmission scanning update signal and transmission of a subsequent confirmation signal. However, when transmitting the confirmation signal, the communication controller 122-2 adds information indicating the transmission beam direction of a local station thereof related to transmission of a direction search signal to the confirmation signal, and stops transmission of a main signal. The order of the transmission beam directions selected in determining a beam direction related to single transmission scanning may be arbitrary as long as the transmission beam direction of a local station is a transmission beam direction that has not been subjected to beam direction search processing yet.

As a result, the communication controller 122-1 of the wireless station 10-1 is notified of a transmission beam direction related to transmission of a direction search signal by the information added to the confirmation signal received from the wireless station 10-2. The communication controller 122-1 of the wireless station 10-1 transmits a transmission scanning update signal or a transmission scanning end signal to the wireless station 10-2 for the transmission beam direction of which the communication controller 122-1 has been notified after executing the beam direction search processing. Therefore, the communication controller 122-1 of the wireless station 10-1 and the communication controller 122-2 of the wireless station 10-2 share information on the transmission beam direction related to transmission of the direction search signal that has been subjected to beam direction search processing. Therefore, the order and the number of beam directions related to execution of the beam direction search processing do not necessarily have to be set in advance between the wireless stations 10-1 and 10-2.

Note that the timing at which the communication controller 122-1 of the wireless station 10-1 transmits a reception scanning start signal or the timing at which the communication controller 122-2 of the wireless station 10-2 transmits a confirmation signal may be determined when the communication speed of a main signal related to transmission and reception is lower than a predetermined communication speed. The predetermined communication speed only needs to be lower than a communication speed which is made possible in a bandwidth allocated for transmission and reception of a main signal in the bandwidth of the first frequency band.

In addition, a main signal is transmitted in the first frequency band, and information required for controlling a beam direction is transmitted independently of the main signal in the second frequency band. Therefore, the communication controller 122-1 of the wireless station 10-1 may search for a beam direction in which a better transmission condition can be obtained by modifying a beam direction of a local station thereof or an opposite station during communication. When modifying the beam direction of a local station, the communication controller 122-1 of the wireless station 10-1 changes the beam direction from the beam direction of the first antenna 16-1 at that time by every predetermined minute angle (for example, by every 0.5° to 2°). The communication controller 122-1 may acquire a metric indicating a reception condition for each beam direction after the change from the wireless station 10-2 as an opposite station via the second transceiver 114-1. The communication controller 122-1 specifies a beam direction indicating a reception condition in which the acquired metric is the best, outputs a direction control signal indicating the specified beam direction to the first transceiver 112-1, and thereby transmits a signal in the direction using the first antenna 16-1.

When acquiring a metric for each beam direction of a local station, the wireless stations 10-1 and 10-2 perform the following processing.

The communication controller 122-1 of the wireless station 10-1 outputs a direction control signal indicating the beam direction of a local station thereof after the change to the first transceiver 112-1, and transmits a main signal in the direction using the first antenna 16-1 of the wireless station 10-1. The communication controller 122-1 transmits a reception condition request signal related to the beam direction to the wireless station 10-2 via the second transceiver 114-1.

The communication controller 122-2 of the wireless station 10-2 receives a reception condition request signal from the wireless station 10-1 via the second transceiver 114-2, and specifies a beam direction indicated by the received reception condition request signal. The communication controller 122-2 measures a metric indicating a reception condition of a main signal received via the first transceiver 112-2 and transmits a reception condition report signal indicating the measured metric to the wireless station 10-1 via the second transceiver 114-2.

The communication controller 122-1 of the wireless station 10-1 specifies the metric indicated by the reception condition report signal received from the wireless station 10-2 via the second transceiver 114-2 as a metric indicating a reception condition related to the beam direction.

When modifying a beam direction of a opposite station, the communication controller 122-1 of the wireless station 10-1 changes the beam direction of the first antenna 16-2 of the wireless station 10-2 as an opposite station by every minute angle via the second transceiver 114-1, and acquires a metric indicating a reception condition for each beam direction after the change from the first transceiver 112-1. In this case, the communication controller 122-1 specifies a beam direction indicating a reception condition in which the acquired metric is the best, and transmits the specified beam direction to the communication controller 122-2 of the wireless station 10-2 via the second transceiver 114-1. The communication controller 122-2 outputs a direction control signal indicating the specified beam direction to the first transceiver 112-2, and thereby transmits a signal in the direction using the first antenna 16-2.

When acquiring a metric for each beam direction of an opposite station, the wireless stations 10-1 and 10-2 perform the following processing.

The communication controller 122-1 of the wireless station 10-1 transmits information on the beam direction after the change of the wireless station 10-2 as an opposite station to the wireless station 10-2 via the second transceiver 114-1.

The communication controller 122-2 of the wireless station 10-2 receives information on the beam direction from the wireless station 10-1 via the second transceiver 114-2, outputs a direction control signal indicating the received beam direction to the first transceiver 112-2, and transmits a signal in the direction using the first antenna 16-2 of the wireless station 10-2.

The communication controller 122-1 of the wireless station 10-1 measures a metric indicating a reception condition of a main signal received via the first transceiver 112-1.

In the above-described embodiments, the case where the first frequency band is constituted by a single frequency band has been exemplified, but the present invention is not limited thereto. The first frequency band may be constituted by a plurality of frequency bands, and various signals may be transmitted and received between wireless stations using the plurality of frequency bands. The signal to be transmitted and received may be either a direction search signal or a main signal.

In the first embodiment, the plurality of frequency bands may be shared by one first antenna 16 for each wireless station 10, and a frequency division duplex (FDD) system may be applied. For example, the communication controller 122-1 of the wireless station 10-1 allocates a 70 GHz band to the first transceiver 112-1 as a frequency band used for transmitting a signal to the wireless station 10-2. In this case, the communication controller 122-2 of the wireless station 10-2 allocates a 70 GHz band to the first transceiver 112-2 as a frequency band used for receiving a signal from the wireless station 10-1. On the other hand, the communication controller 122-2 of the wireless station 10-2 allocates an 80 GHz band to the first transceiver 112-2 as a frequency band used for transmitting a signal to the wireless station 10-2. In this case, the communication controller 122-1 of the wireless station 10-1 allocates an 80 GHz band to the first transceiver 112-1 as a frequency band used for receiving a signal from the wireless station 10-2.

In the second embodiment, a plurality of frequency bands only needs to be allocated to the transmission variable beam antenna 17 or the reception variable beam antenna 18 depending on transmission or reception for each wireless station 10. For example, the communication controller 122-1 of the wireless station 10-1 allocates a 70 GHz band to the first transceiver 112-1 as a frequency band used for transmitting a signal to the wireless station 10-2, and transmits a radio wave carrying the signal using the transmission variable beam antenna 17-1. In this case, the communication controller 122-2 of the wireless station 10-2 allocates a 70 GHz band to the first transceiver 112-2 as a frequency band used for receiving a signal from the wireless station 10-1, and receives a radio wave carrying the signal using the reception variable beam antenna 18-2. On the other hand, the communication controller 122-2 of the wireless station 10-2 allocates an 80 GHz band to the first transceiver 112-2 as a frequency band used for transmitting a signal to the wireless station 10-1, and transmits a radio wave carrying the signal using the transmission variable beam antenna 17-2. In this case, the communication controller 122-1 of the wireless station 10-1 allocates an 80 GHz band to the first transceiver 112-1 as a frequency band used for receiving a signal from the wireless station 10-2, and receives a radio wave carrying the signal using the reception variable beam antenna 18-1.

In the example shown in FIGS. 3 and 7, when the wireless station 10-2 mainly requests connection to the wireless station 10-1, in the example shown in FIG. 4, the example in which the beam direction determination procedure is started when the wireless station 10-3 requests connection to the wireless station 10-1 has been described. The timing at which the beam direction determination procedure is started is not limited thereto. The timing may be when a transmission condition of a main signal during communication is inferior to a predetermined transmission condition. The case where the transmission condition is inferior to a predetermined transmission condition also includes a case where a connection is interrupted because a signal cannot be transmitted or received.

More specifically, when the communication controller 122-2 of the wireless station 10-2 receives a main signal from the wireless station 10-1 via the first transceiver 112-2, the communication controller 122-2 measures a metric indicating a reception condition of the received main signal for each predetermined cycle. When a reception condition indicated by a measured metric is inferior to a reception condition indicated by a predetermined threshold value, the communication controller 122-2 transmits a connection request signal to the wireless station 10-1 as an opposite station via the second transceiver 114-2. The communication controller 122-1 of the wireless station 10-1 can start control of a beam direction with the wireless station 10-2 with the connection request signal received from the wireless station 10-2 as a trigger.

In addition, the above-described names of the functional units constituting the wireless station 10 and the above-described names of the control signals may be arbitrarily determined, and do not limit the technical scope of the present invention. The number of the wireless stations 10 constituting the wireless communication system 1 is not limited to three, but may be two or four or more. Among the wireless stations 10, the number of the wireless stations 10 capable of performing communication using the first frequency band and the second frequency band only needs to be at least two. The number of the wireless stations 10 each including the variable beam antenna 16 or the transmission variable beam antenna 17 and the reception variable beam antenna 18 only needs to be at least one. When the beam directions of the beam antennas of all the other wireless stations 10 are fixed, at least one of the wireless stations 10 is desirably a fixed station the position of which is fixed rather than a movable mobile station. The number of the beam directions of each wireless station is not limited to four, but may be two, three, or five or more. The order of the beam directions in each beam direction determination procedure does not necessarily have to be the order of the reference symbols, and may be arbitrarily set.

DESCRIPTION OF THE REFERENCE SYMBOLS

1: Wireless communication system
10: Wireless station
12: 60-GHz band transceiver
14: 920-MHz band transceiver
16: First antenna (variable beam antenna)
17: Transmission variable beam antenna
18: Reception variable beam antenna
19: Second antenna (non-directional antenna)
112: First transceiver
114: Second transceiver
120: Controller
122: Communication controller

The invention claimed is:

1. A wireless communication system comprising a plurality of wireless stations, wherein
each of at least two of the plurality of wireless stations comprises:
a first antenna transmitting a radio wave in a first frequency band;
a second antenna transmitting a radio wave in a second frequency band lower in frequency than the first frequency band;
a first transceiver transmitting and receiving a main signal in the first frequency band; and
a second transceiver transmitting and receiving a control signal in the second frequency band, and
at least one of the at least two wireless stations comprises:
a variable beam antenna making a beam direction variable as the first antenna;

a wide angle antenna having a radiation range equal to or wider than a variable range of the beam direction as the second antenna; and a controller controlling the beam direction of the variable beam antenna based on the control signal, wherein when the controller receives information on search for the beam direction as the control signal from another station, the controller searches for a beam direction of a variable beam antenna of a local station thereof.

2. The wireless communication system according to claim 1, wherein when the controller measures a transmission condition of the main signal and the transmission condition is inferior to a predetermined transmission condition, the controller transmits information on search for the beam direction as the control signal to another station.

3. The wireless communication system according to claim 1, wherein the at least one wireless station comprises: a transmission variable beam antenna transmitting a radio wave in the first frequency band and a reception variable beam antenna receiving a radio wave in the first frequency band as the variable beam antenna, and the controller determines a beam direction of the transmission variable beam antenna of another station and a beam direction of the reception variable beam antenna of a local station thereof independently.

4. The wireless communication system according to claim 1, wherein a transmission speed in the second frequency band is lower than a transmission speed in the first frequency band.

5. A wireless communication method in a wireless communication system including a plurality of wireless stations, wherein each of at least two of the plurality of wireless stations comprises:

a first antenna transmitting a radio wave in a first frequency band; and a second antenna transmitting a radio wave in a second frequency band lower in frequency than the first frequency band, each of at least two of the plurality of wireless stations:

transmits and receives a main signal in the first frequency band; and transmits and receives a control signal in the second frequency band, at least one of the at least two wireless stations comprises:

a variable beam antenna making a beam direction variable as the first antenna; and a wide angle antenna having a radiation range equal to or wider than a variable range of the beam direction as the second antenna, and at least one of the at least two wireless stations controls the beam direction of the variable beam antenna based on the control signal, and searches for a beam direction of the variable beam antenna thereof when receiving information on search for the beam direction as the control signal from another station.

6. A wireless communication system comprising a plurality of wireless stations, wherein each of at least two of the plurality of wireless stations comprises:

a first antenna transmitting a radio wave in a first frequency band;

a second antenna transmitting a radio wave in a second frequency band lower in frequency than the first frequency band;

a first transceiver transmitting and receiving a main signal in the first frequency band; and a second transceiver transmitting and receiving a control signal in the second frequency band, and at least one of the at least two wireless stations comprises:

a variable beam antenna making a beam direction variable as the first antenna;

a wide angle antenna having a radiation range equal to or wider than a variable range of the beam direction as the second antenna; and a controller controlling the beam direction of the variable beam antenna based on the control signal, wherein when the controller measures a transmission condition of the main signal and the transmission condition is inferior to a predetermined transmission condition, the controller transmits information on search for the beam direction as the control signal to another station.

* * * * *